United States Patent Office 3,420,391
Patented Jan. 7, 1969

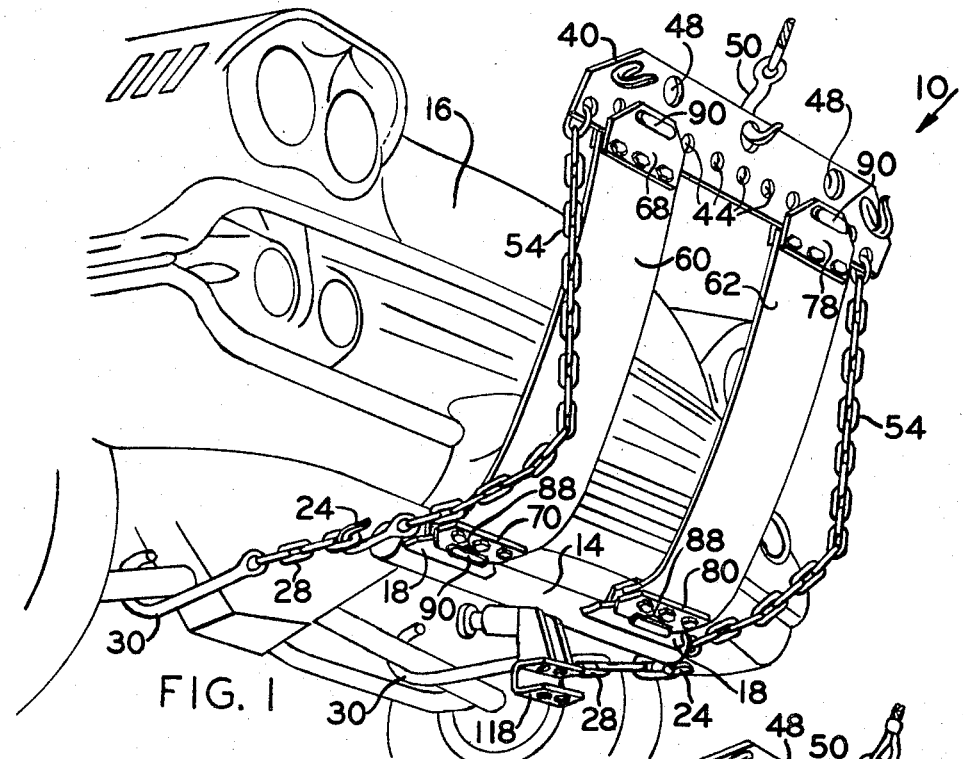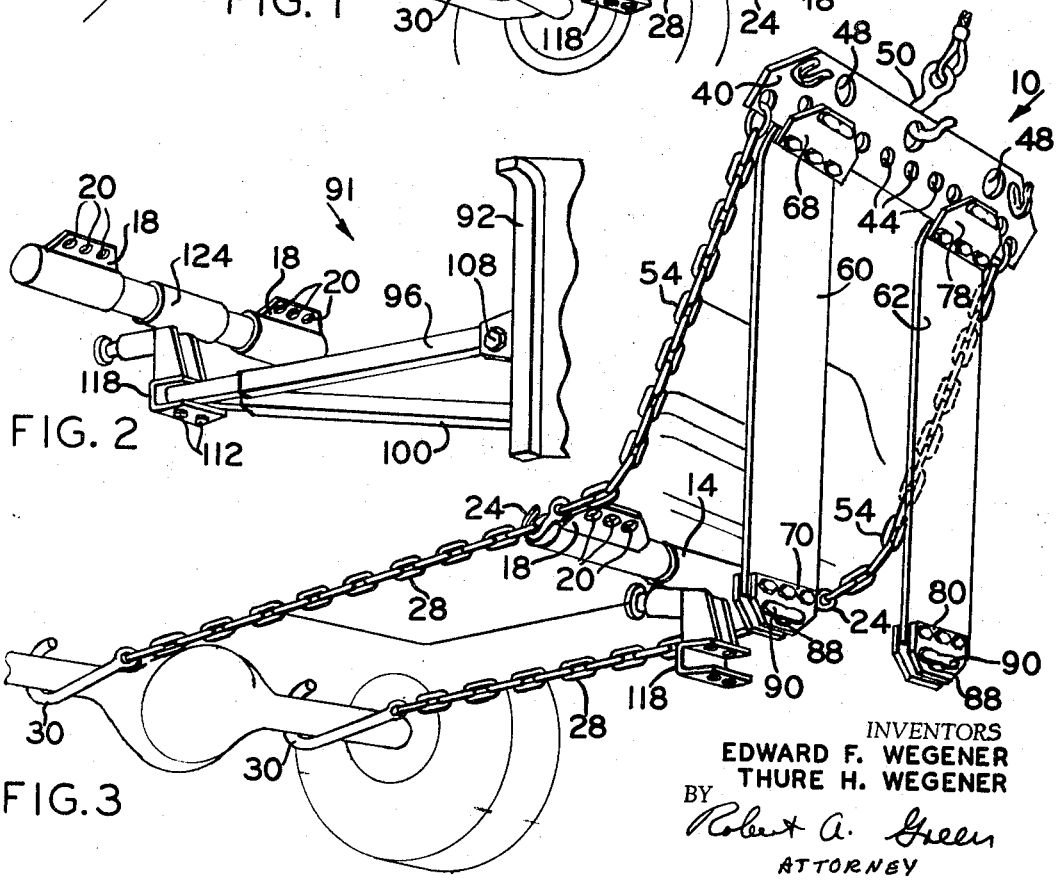

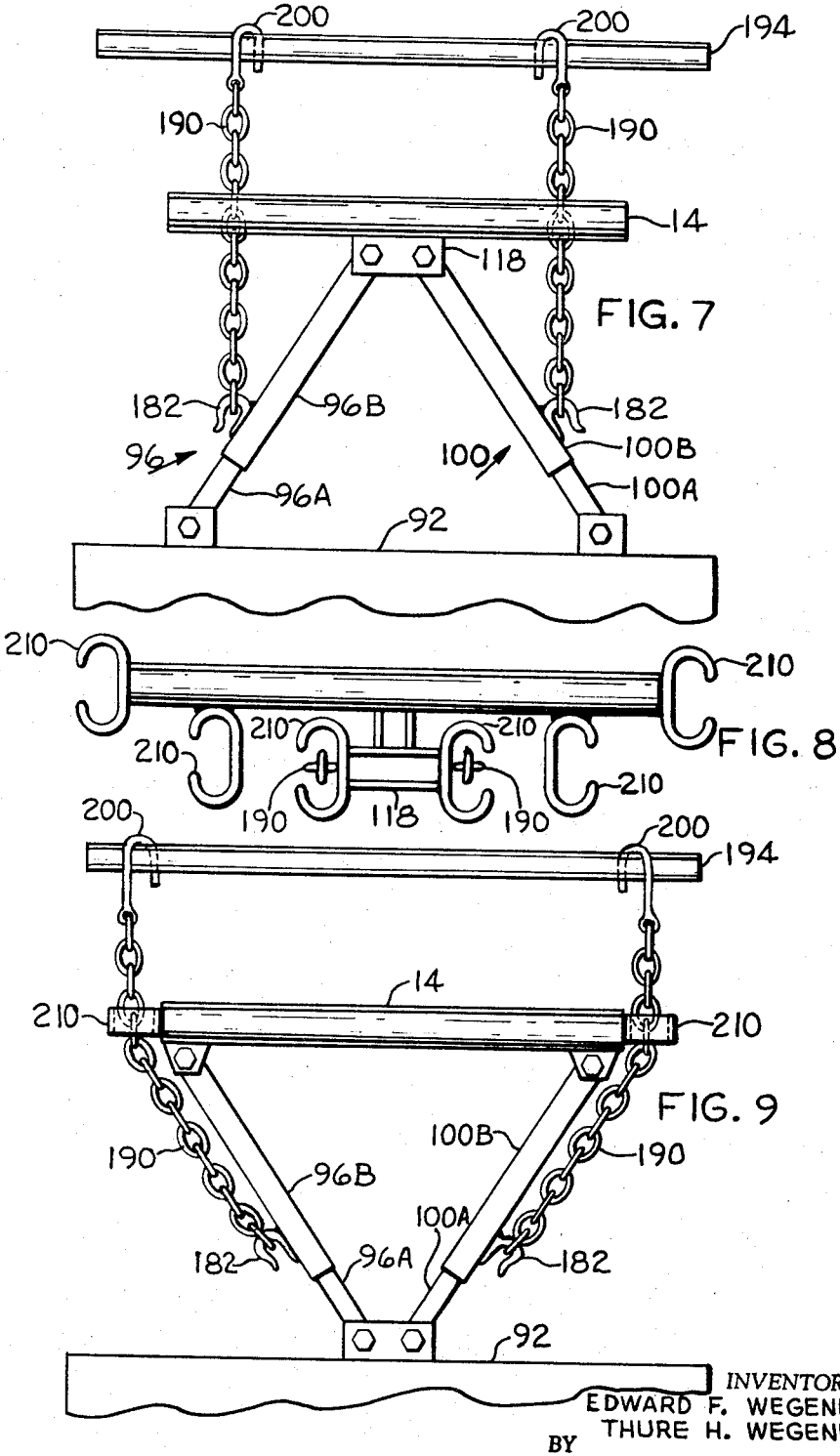

3,420,391
TOWING APPARATUS
Edward F. Wegener and Thure H. Wegener, both of South River Road, Cranbury, N.J. 08512
Continuation of application Ser. No. 575,920, Aug. 19, 1966, which is a continuation-in-part of application Ser. No. 399,222, Sept. 25, 1964. This application Nov. 15, 1967, Ser. No. 683,410
U.S. Cl. 214—86          29 Claims
Int. Cl. B66c 1/14

ABSTRACT OF THE DISCLOSURE

The disclosure is of a vehicle lift and tow bar mechanism which includes an upper metal bar and a lower metal bar between which extend a pair of flexible slings and a pair of chains, either of which pairs can be selected to cradle the end of a wreck to be towed. The chains are longer than the slings so that, with the slings in place between the bars, the chains hang loose and do not function. The slings are secured to the upper and lower bars by means of couplings which permit them either to be removed to permit the chains to function or to have their side-by-side spacing adjusted to accommodate wrecks of different sizes and shapes. Grab hooks on the lower bar and corresponding chains on the upper bar are provided for permitting the tow bar to be carried in a compact assembly while out of use. When the upper and lower bars are brought together, the hooks and chains are aligned and engaged. This provides a tight compact assembly of the two bars and their associated slings and chains.

---

This invention relates to towing apparatus for lifting and towing disabled vehicles. This application is a continuation of application Ser. No. 575,920, filed Aug. 19, 1966 which is a continuation-in-part of application Ser. No. 399,222, filed Sept. 25, 1964, now abandoned.

In the history of the automobile industry, there have been many developments in the area thereof relating to the handling of disabled vehicles. Initially, relatively simple chain and cable lift apparatus was employed for lifting and towing disabled vehicles, with the primary concern being to accomplish the rescue operation without concern for the "wreck" or the "wrecker" as such. However, as time passed and automobile design advanced, a point was reached at which auto bumper, fender, and grill design became such that a wrecker might cause considerable damage to the vehicle during the rescue operation. To remedy this situation, tow bars have been devised which include flexible slings of fabric, leather, rubber, or the like which contact the disabled vehicle during the towing operation. These slings protect the vehicle during the operation, and, because of the function they must perform, they are necessarily relatively expensive. However, the expense is not of great moment since the slings are ordinarily strong and long-lasting.

However, another problem has arisen and this problem concerns the situation which exists when a vehicle is so damaged that jagged pieces of metal are presented to the tow bar when the tow bar is to be attached to the wreck. In this case, there is no need to protect the vehicle and, in fact, there is need to protect the slings of the tow bar which can be severed or damaged by the jagged metal. With most tow bars, there is no way to protect the flexible sling members, and, in most cases, if there were precautions that could be taken, wrecker operators in general either could not take the time to take these precautions, or they would not bother to do so.

At the present time, wrecker operators must carry two different types of tow bars to properly handle all types of wrecking operations. It is easy to see how cumbersome it is to carry two tow bars and how cumbersome and time-consuming it is to be required to change from one to another at the scene of a wreck.

Accordingly, the principles and objects of the invention concern the provision of an improved tow bar including flexible non-metal sling members having means for protecting a disabled vehicle and, at the same time, having means for protecting the sling members in simple fashion where required.

Briefly, a tow bar embodying the invention is attached to a wrecker and includes both chain means and flexible sling means for attachment to a wreck or disabled vehicle. The chain means and the sling means are so related that, when required, the sling means takes over and provides the required lifting force and vehicle-protecting functions. Similarly, where it is desired to protect the sling means, they may be readily and instantly removed and by-passed by the chain means.

The invention is described in greater detail with reference to the drawings wherein:

FIG. 1 is a perspective view of towing apparatus embodying the invention and a portion of a wreck with which it is used;

FIG. 2 is a perspective view of a portion of the apparatus of FIG. 1 and auxiliary means used therewith;

FIG. 3 shows the apparatus of FIG. 1 illustrating an alternative arrangement for using it with a wreck;

FIG. 7 is a plan view of portions of the tow bar of the invention showing a novel hookup to a wreck;

FIG. 8 is a front view of a portion of the hookup apparatus of FIG. 7 and auxiliary apparatus for use therewith shown in several possible locations; and FIG. 9 is a plan view of the apparatus shown in FIG. 7 showing a hookup arrangement using auxiliary apparatus shown in FIG. 8.

Figure 4:
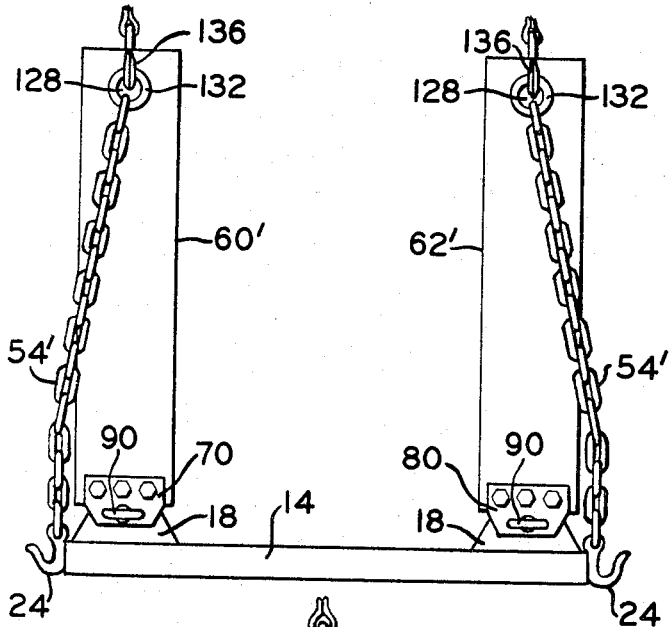
FIG. 4 is a front elevational view of a portion of a modification of the apparatus of FIG. 1.

The principles of the invention are applicable to many of the large number of different types of tow bars which are available commercially. However, the invention will be illustrated and described with respect to only one known type of tow bar.

In its simplest form, a tow bar 10 includes a first metal bar 14 which is adapted to engage a disabled vehicle or wreck 16 to be raised. This bar is known as an anchor bar and, in use, normally lies under and behind the bumper of the wreck. The anchor bar 14 may comprise a flat metal plate, or it may be in the form of a cylinder. The anchor bar is provided with means for attaching flexible sling belts (to be described below) thereto, and this means comprises either a single elongated flange extending along substantially the entire length of the bar or a pair of spaced apart flanges 18, as shown. The flanges 18 are provided with a plurality of apertures 20 aligned on an axis parallel to the axis of the anchor bar 14.

The flanges 18 may be fixed in place on anchor bar 14, or they may be formed as portions of sleeves 19 which are slidably mounted on anchor bar 14 as shown in FIG. 2. This type of construction permits considerable lateral adjustment of the flanges 18 and the apparatus secured thereto.

The anchor bar 14 is also provided at its ends with hooks 24 which are known as grab hooks. A separate chain 28 is adapted to be secured by a link to each grab hook, and the end of each chain 28 is provided with a hook 30 which is adapted to be secured to a convenient portion of the undercarriage of the disabled vehicle 16 during a lifting and towing operation.

The tow bar 10 also includes means for applying a lifting force to the tow bar once it has been attached to the wreck or disabled vehicle 16. In FIG. 1, this means comprises a metal plate or bar 40, which is commonly known in the industry as a lifter bar. The lifter bar 40 is coupled to the anchor bar 14 so that lifting forces applied to the lifter bar may be transmitted to the anchor bar and to the disabled vehicle. The arrangement for coupling the lifter bar to the anchor bar comprises an important feature of the present invention.

In a tow bar 10 embodying the invention, the lifter bar 40 preferably comprises a flat plate as shown, however, it may comprise a cylindrical bar which, like bar 14, is provided with a flange or flanges extending longitudinally along its length. A row of axially aligned apertures 44 is provided along the length of the lifter bar near the edge thereof. The lifter bar is also provided with several relatively large aligned apertures 48, spaced apart along the bar, by which a lifting hook or hooks 50 or the like may be coupled to the tow bar. The hook 50 is coupled to the usual crane on the wrecker vehicle.

The lifter bar 40 and the anchor bar 14 are interconnected, in part, by means of chains or cables 54 connected between corresponding ends of these bars. The chains 54 are either permanently or removably secured to the ends of the bars 14 and 40 in any convenient manner. The chains 54 are of a length suitable to provide a convenient spacing between the anchor bar and the lifter bar.

In addition, according to the invention, the anchor bar 14 and lifter bar 40 are interconnected by a pair of flexible slings 60 and 62 which are adjustably and removably secured thereto. The sling 60 includes upper and lower end flanges 68 and 70, respectively, and sling 62 includes upper and lower end flanges 78 and 80, respectively. The flanges are preferably of metal and are provided with a plurality of aligned apertures 88 which are adapted to be positioned in alignment with selected apertures 20 and 44 in the anchor bar and lifter bar, respectively. A spring-lock push pin 90 or some other easily inserted and easily removed locking means is inserted in the aligned apertures in the flanges and bars to hold the slings in place on the bars 14 and 40. It can be seen that, by selecting the holes 20 and 44 to which the slings 60 and 62 are secured, one may adjust the side-by-side spacing between them to accommodate a wide variety of widths and types of vehicles.

According to the invention, the slings 60 and 62 are of such a length that, when they are secured between the anchor bar 14 and lifter bar 40 for use in lifting a disabled vehicle or wreck, they are shorter than the chains 54 and the anchor bar and lifter bar are so spaced by the slings that the chains hang loosely with some slack between them. Thus, when secured in place, the slings are in contact with the vehicle and apply lifting pressure thereto and the chains are not in lifting contact with the vehicle.

In practicing the present invention, the slings may be made of any suitable flexible material, such as fabric, leather, rubber, metal-reinforced material, or the like.

Coupling means 91 is provided for securing the tow bar 10 to the wrecker 92 to hold the wreck and wrecker spaced apart during the towing operation, and any suitable known means may be employed for this purpose. For purposes of clarity, this means 91 is shown only in FIG. 2. One suitable arrangement includes two telescoping bars 96 and 100, each pivotally secured at one end to the wrecker about a horizontal pin 108. The other ends of the bars 96 and 100 are brought together and are pivotally secured about a vertical pin 112 to a bracket 118 which itself is secured to a sleeve 124 which is rotatably mounted on the anchor bar 14.

In using the tow bar of the invention, the slings 60 and 62 may be normally secured to the lifter bar 40 and anchor bar 14 so that the tow bar is prepared for lifting a vehicle, the front end of which is to be protected. As shown in FIG. 1, with the anchor bar behind the bumper of the wreck, only the slings 60 and 62 contact and cradle the wreck. If the tow bar is to be used to lift a vehicle having a damaged front end so that the slings are to be protected, either the ends thereof secured to the lifter bar may be detached by removing the push pins 90 and allowing the slings to hang freely (FIG. 3), or the slings may be detached completely from both the anchor bar and lifter bar. With this arrangement, the chains 54 contact and cradle the wreck as it is raised.

Figure 5:
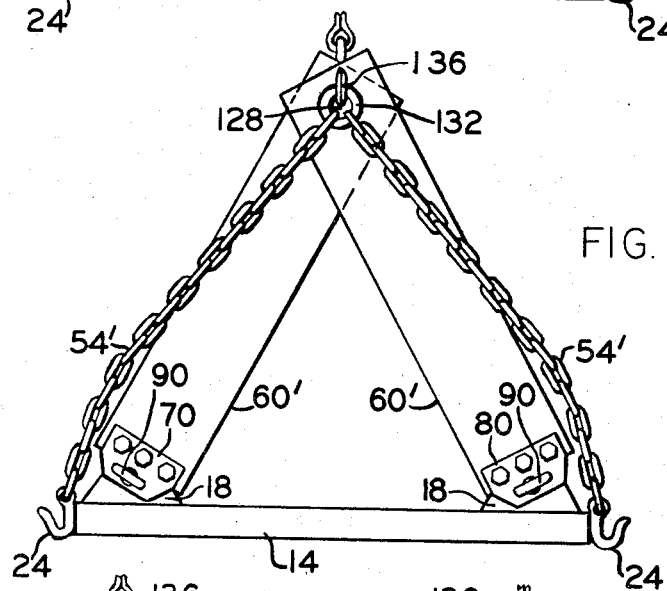
FIG. 5 shows the apparatus of FIG. 4 in one mode of operation.

In a modification of the invention shown in FIGS. 4 and 5, a tow bar 120 includes an anchor bar 14 of the type described above and having the structural features described above, including the flanges 18 for attaching a pair of flexible sling members 60' and 62'. However, in this embodiment of the invention, the lifter bar is omitted, and the upper ends of the sling members 60' and 62' are provided with relatively large apertures 128 in which rugged steel grommets 132 or the like are secured for coupling to a lifting hook 136. In addition, two chains 54' are provided coupled between the grab hooks 24 and the lifting hook 136. As described above, the slings are shorter than the chains so that when they are in place, they cradle the wreck and the chains do not affect the lifting operation.

In one arrangement for using this embodiment of the invention (FIG. 5), the lower ends of the sling members 60' and 62' are secured to the anchor bar 14 at the desired locations, and the upper ends are positioned overlapping each other, with the apertures 128 therein aligned. The lifting hook 136 is inserted in the two aligned apertures in the sling members.

Figure 6:
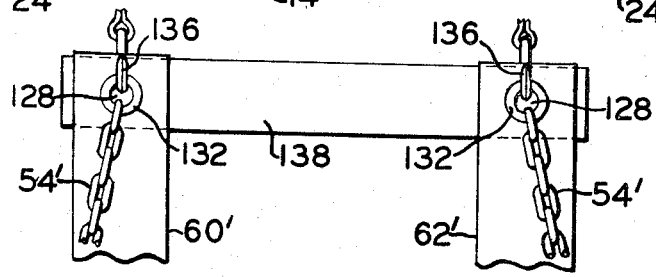
FIG. 6 shows a portion of the apparatus of FIG. 5 in another mode of operation.
Figure 10:
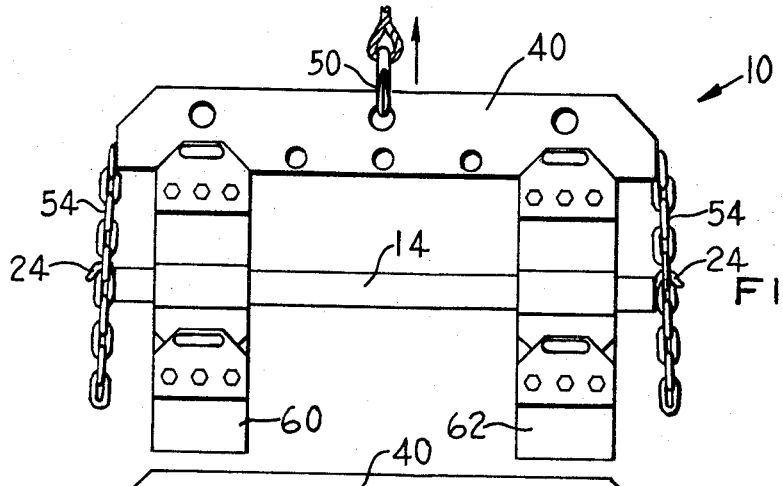
FIGS. 10–13 show stowing of the tow bar on the wrecker between towing jobs.

Alternatively, in using the modification shown in FIG. 4, the sling members 60' and 62' may be held apart and each secured to a separate lifting hook 136. If desired, in the latter arrangement for using the invention and referring to FIG. 6, after the hooks 136 have been inserted in the apertures 128 in the slings, a spreader plate 138, which is used as means for holding the sling members spread apart and having suitably large apertures, is threaded over the lifting hooks. In this use of the invention, the spreader plate 138 does not perform a lifting function.

The tow bar of the invention has many advantages, one of which is that the slings can be secured to the anchor bar and lifter bar, with the spacing between them adjustable to accommodate vehicles of different size and construction, such as large cars, compact cars, midget cars, and the like. In addition, the slings may be readily attached and removed as the particular towing situation requires. Thus, both the towed vehicle and the tow bar itself can be properly protected as required.

Another advantage of the invention is that the tow bar can be used with chain connections alone between the anchor bar and the lifter bar or with flexible slings alone between these two members.

A novel arrangement for coupling tow bar 10 and bars 96 and 100 to a wreck is shown in FIG. 7, with only sufficient detail being displayed to illustrate the principles of the invention. In this arrangement, referring to FIG. 7, if the bars 96 and 100 are telescoping bars, although they need not be to practice the invention, then inner members 96A and 100A are pivotally secured to the tailgate of the wrecker 92, and the outer members 96B and 100B are secured to bracket 118 on the anchor bar 14. In addition, the outer member 96B and 100B of each bar is provided with a grab hook 182 at some convenient location. Grab hooks 24 on anchor bar 14 may be omitted in this embodiment of the invention.

In the novel coupling arrangement of the invention, a cable or chain 190 is coupled taut between the frame 194 of the wreck and each grab hook 182. In this arrangement, the chains 190 preferably lie under the anchor bar 14. Each chain 190 may have a hook 200 at each end, or it may have hook 200 at one end to engage the frame 194 of the wreck, and it may engage the grab hook 182 by a ring (not shown) or by one of its links or in any other suitable fashion.

If desired, guide means may be provided, preferably on the anchor bar, to serve as a guide or retainer for the chains 190 as they extend from the frame 194 of the wreck and the grab hooks 182 on tow bars 96 and 100. This guide means may comprise a pair of C-shaped plates 210, one for each chain 190, through which the chains extend, and these plates may be positioned, for example, at the center of the anchor bar, at the ends of the anchor bar at locations formerly occupied by grab hooks 24, or at any suitable intermediate location, or at all of these locations. The various positions are all shown in FIG. 8.

Of course, an any arrangement of the tow bar of the invention, the bars 96 and 100 may be reversed so that the apex of the V formed by the bars is secured to the tailgate of the wrecker, and the spaced-apart free ends of the bars are secured to the anchor bar 14. This arrangement, which is shown in FIG. 9, is particularly convenient for handling cables 190 when the C-shaped guide members 210 are positioned at the ends of the anchor bar 14.

One advantage of the tow bar construction described above, particularly that shown in FIG. 1 accrues, not in performing a towing operation, but in stowing the tow bar on the wrecker between towing jobs. This aspect of the invention is shown in FIGS. 10 to 13 wherein the showing is rather schematic and only enough detail is shown to illustrate the principles of the invention.

Assuming that a towing job has been completed, then the connecting chains 28, extending between grab hooks 24 on anchor bar 14 and the wreck, are removed and lifting force is applied through the crane of the wrecker to raise the tow bar to a convenient elevated position. The usual position finds the V-bars 96 and 100 almost vertical and bearing against the tailgate of the wrecker. The operator then grasps anchor bar 14 and raises it toward lifter bar 40 so that chains 54 are accessible to grab hooks 24. At this time, the belts 60 and 62 and the chains 54 hang loose and form loops which hang down beneath both bars, and the grab hooks are oriented so that they open downwardly. Now, the operator hooks the grab hooks 24 into the chains 54, so that the lifter bar and anchor bar are held together rather tightly and the tow bar is stowed neatly and compactly and relatively rigidly for travel to and from a wreck.

It can be seen that, in order to achieve this "out-of-use" configuration, the chains 54 must be accessible to the grab hooks on the anchor bar when the anchor bar is raised. Thus, the area of connection of the chains to th elifter bar must be properly selected. The optimum arrangement is one in which the chains extend between the anchor bar and the lifter bar in alignment with, or close to alignment with, the grab hooks and, preferably, both chains and grab hooks at or near the ends of the anchor and lifter bars outside the slings 60 and 62.

Figure 11:
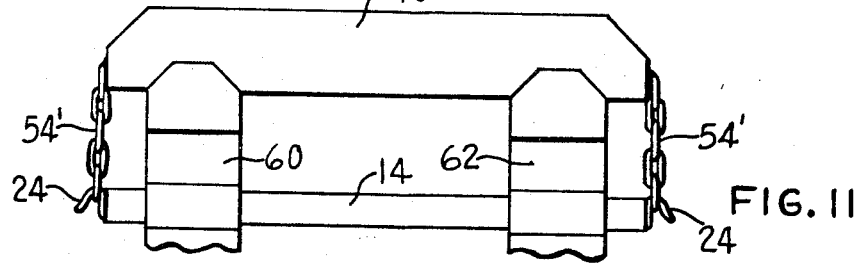

Of course, other arrangements of chains and grab hooks could be employed to achieve the above-described stowage configuration. In FIG. 11, a short auxiliary length of chain 54' is added to the tow bar connected to the ends of the lifter bar 40 and of sufficient length to be accesible to the grab hooks 24 when the anchor bar 14 is raised to the lifter bar as described above. In addition, as in FIG. 12, full chains 54 or short lengths of chains 54' may be secured to the lifter bar 40 inwardly of its ends to engage grab hooks 24' located at corresponding positions on the anchor bar 14 inwardly of its ends.

Figure 12:
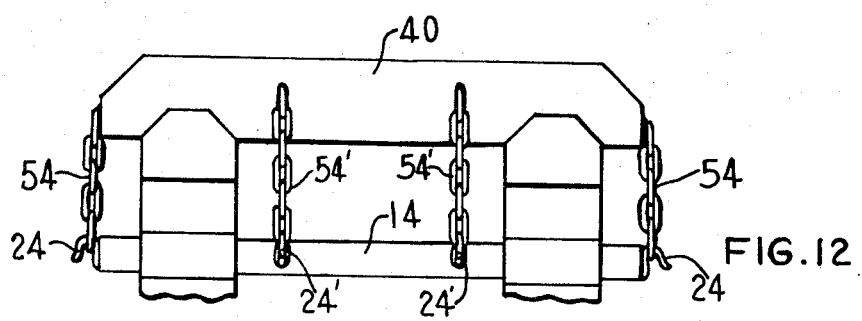
Figure 13:
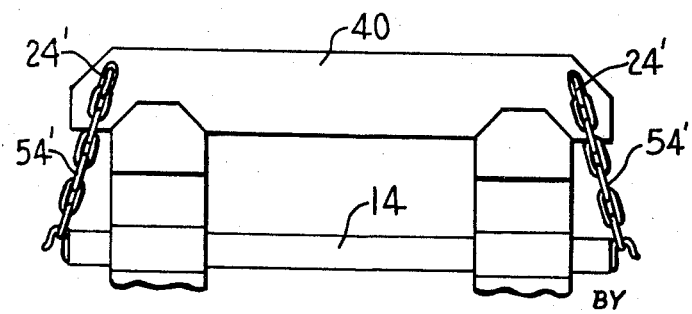

In FIG. 12, if the inward chains 54' could not perform the above-described wreck-cradling function, then the tow bar would also include chains 54 and grab hooks 24 at the ends of the bars 14 and 40 for this purpose. In another arrangement shown in FIG. 13, grab hooks 24' might be placed on the lifter bar 40 as shown in FIG. 1 or at some other location than at the ends of the lifter bar to engage short lengths of chain 54' connected to the anchor bar 14 or to engage full chains 54 connected between the anchor and lifter bars. However, this is not as convenient to manipulate as the arrangements described above where the chains are secured to the lifter bar and the grab hooks are located on the anchor bar and can be turned to face downwardly.

What is claimed is:
1. Vehicle lifting apparatus comprising
a first rigid bar,
coupling means on said first bar for coupling the bar to a vehicle to be towed,
sling attaching means secured to said first bar,
a pair of flexible, resilient slings each having a metal bracket at one end, quick disconnect means detachably coupling said slings to said attaching means whereby said slings may be connected to or detached from said attaching means and said bar, said slings being adapted to cradle a vehicle to be lifted,
said attaching means and said metal brackets including a pluality of interconnecting positions so that the coupling of said slings to said attaching means is adjustable to permit the side-by-side spacing between said slings to be adjustable,
said slings also including second means for attachment to a crane for applying lifting force, and
auxiliary means coupled to said first bar for cradling a vehicle in place of said slings.
2. Vehicle lifting apparatus comprising
a first rigid bar adapted to be oriented horizontally under a portion of a vehicle,
a second rigid bar adapted to be oriented horizontally above the bumper of said vehicle and adapted to have a lifting crane coupled thereto,
coupling means secured to said first bar for coupling the first bar to said vehicle,
sling-attaching means secured to said first bar,
a pair of flexible, resilient double-ended slings having first coupling means at one end for detachably coupling said slings to said attaching means, said slings being adapted to cradle said vehicle,
said attaching means on said first bar and said first coupling means at one end of each sling also being adjustable to permit the coupling of said slings to said attaching means and the spacing between said slings to be adjustable,
said slings also including, at their other ends, second coupling means for attachment to said second bar, and
auxiliary flexible means coupled between said first bar and said second bar for cradling a vehicle when said slings are removed,
said slings being shorter in length than said auxiliary means.
3. The apparatus defined in claim 2 wherein said coupling means comprises a pair of grab hooks on said first bar, and
said sling-attaching means on said first bar comprises a pair of apertured flanges, to which said one end of said slings are attached.
4. The apparatus defined in claim 2 wherein said sling-attaching means on said first bar comprises a pair of brackets rotatably and slidably mounted on said first bar.
5. The apparatus defined in claim 2 wherein said second bar has a plurality of coupling apertures to which said other ends of said slings are connected.
6. The apparatus defined in claim 2 wherein said sling-attaching means on said first bar comprises two apertured brackets which are slidably and rotatably mounted on said first bar, and said second bar includes a plurality of aligned apertures to permit attachment of said second coupling means to different positions thereon.

7. The apparatus defined in claim 2 wherein said auxiliary flexible means comprises a pair of chains.

8. The apparatus defined in claim 2 wherein said auxiliary flexible means comprises a pair of chains coupled between the ends of said first bar and the ends of said second bar outwardly of said slings.

9. The apparatus defined in claim 2 and including a coupling and spacing means secured to said first bar and adapted to be coupled between said first bar and the wrecker vehicle.

10. The apparatus defined in claim 2 and including a coupling and spacing means secured to said first bar and adapted to be coupled between said first bar and the wrecker vehicle, said coupling and spacing means including a pair of telescoping bars coupled between said first bar and the wrecker vehicle.

11. A vehicle lifting and towing apparatus including
first and second rigid bars adapted to be spaced apart in front of an end of a vehicle to be raised with said first bar adapted to be positioned beneath the bumper of said vehicle and said second bar positioned generally vertically above said first bar and adapted to be out of contact with said vehicle,
a pair of flexible, non-metallic slings secured at their ends by flexible couplings to said first and second bars so that said slings can pivot at their ends with respect to said bars as a vehicle is towed,
said slings being adapted to contact said bumper of said vehicle and thus cradle an end of a vehicle to be towed,
said couplings being laterally movable on said bars so that the side-by-side spacing between said slings can be adjusted to accommodate vehicles of different sizes.

12. The apparatus defined in claim 11 wherein
the couplings of said slings to said first bar include means for detaching the slings from said first bar, and including a pair of chains secured between said bars to cradle a vehicle when said slings are removed,
said chains being longer than said slings when said slings are connected to both bars so that the slings cradle a vehicle but the chains do not cradle a vehicle,
the couplings of said slings to said first bar including a sleeve which is slidably and rotatably mounted on said first bar so that the side-to-side spacing of said slings is effected by sliding said sleeves on said first bar.

13. Vehicle lifting apparatus comprising
a pair of resilient flexible straps for cradling a vehicle,
a pair of flexible chains for cradling a vehicle,
a support bar supporting said straps and chains at one end in operative relation with each other,
said bar and said straps including adjustable interconnection means such that said straps may be removed from said bar or the side-by-side spacing between the straps may be adjusted, the spacing between the straps being adjustable to permit them to cradle vehicles of different shapes and sizes,
said chains being longer than said straps when both said straps and chains are in place on said support bar whereby said straps perform a vehicle cradling function and said chains do not perform a vehicle cradling function when both said straps and chains are in place on said support bar,
said straps and chains also including at their other ends means for coupling them to a lifting crane for applying lifting force thereto to raise a disabled vehicle to which the straps and chains are operatively coupled through said support bar.

14. The apparatus defined in claim 13 wherein said other ends of said straps and chains are coupled together to provide for connection to a single lifting crane.

15. The apparatus defined in claim 13 wherein said other ends of said straps and chains are spaced apart to provide a first combination of a strap and a chain at one location and a second combination of a strap and chain at a second location whereby a separate lifting crane may be coupled to each of said first and second combinations of straps and chains.

16. The apparatus defined in claim 13 wherein said other ends of said straps and chains are spaced apart to provide a first combination of a strap and a chain at one location and a second combination of a strap and chain at a second location whereby a separate lifting crane may be coupled to each of said first and second combination of straps and chains, and a spacer bar loosely and removably coupled between said first and second combinations of straps and chains.

17. Vehicle lifting apparatus comprising
a pair of resilient, flexible straps for cradling a vehicle and having upper and lower ends,
a pair of flexible chains for cradling a vehicle and having upper and lower ends,
a support bar supporting said straps and chains in operative relation with each other at their lower ends,
said straps being adjustably and removably secured to said support bar so that the spacing between them may be adjusted or so that they may be completely removed therefrom, the spacing between said straps being adjustable to permit them to cradle vehicles of different shapes and sizes,
said straps performing a vehicle cradling function and said chains not performing a vehicle cradling function when both said straps and chains are in place coupled to said support bar,
the upper end of one strap being coupled to the upper end of the adjacent chain to provide a first combination to which a first lifting crane may be coupled, the upper end of the other strap being coupled to the upper end of the other chain to provide a second combination to which a second lifting crane may be coupled, and
a spacer bar loosely and removably coupled between said first and second combinations of straps and chains.

18. Vehicle lifting apparatus comprising
a first bar adapted to be oriented horizontally under a vehicle,
a second bar adapted to be oriented horizontally and adapted to have a lifting crane coupled thereto, said second bar having a plurality of coupling apertures spaced along the length thereof,
coupling means on said first bar for coupling the bar to said vehicle,
a pair of brackets spaced apart on said first bar and slidably and rotatably mounted thereon,
a pair of flexible, resilient, elongated slings having first means at one end for detachably coupling said slings to said coupling apertures, said slings being adapted to cradle said vehicle,
the coupling of said slings to said coupling apertures being laterally adjustable to permit the side-by-side spacing between said slings to be adjustable,
said slings also including at their other ends second means coupling said slings to said slidable brackets on said first bar so that the side-by-side spacing of said slings is adjustable, and
auxiliary flexible means coupled to said first bar for cradling said vehicle in place of said slings, said auxiliary means being longer than said slings.

19. The apparatus defined in claim 18 wherein said ends of said slings are secured to said first and second bars by means of pins about which the ends of the slings can pivot with respect to the bars when the apparatus is in use.

20. A tow bar comprising
a first elongated upper bar,
a second elongated lower bar of about the same length as said upper bar and oriented substantially parallel thereto with the corresponding ends of said bars being aligned with each other,
a pair of flexible, non-metallic slings secured between said upper bar and said lower bar and secured to corresponding areas thereof so that when said bars are spaced apart to the maximum in working orientation, said slings extend parallel to each other from one bar to the other and can cradle a vehicle between said bars,
said bars also being adapted to be positioned close to each other in non-working orientation, in which position said slings form loops which hang down below said lower bar,
a pair of grab hooks on one bar and a pair of chains secured to the other bar,
said chains and grab hooks being so positioned that one grab hook is vertically aligned with a portion of one chain and the other grab hook is vertically aligned with a portion of the other chain whereby when said first and second bars are positioned close together side by side in non-working orientation and spacing, each grab hook is in contact with and can be locked in engagement with its associated chain whereby the entire tow bar is held as a compact assembly for non-towing movement from place to place.

21. The tow bar defined in claim 20 wherein said grab hooks are at the ends of said lower bar and said chains are secured between corresponding ends of said upper bar and lower bar.

22. The tow bar defined in claim 20 wherein said grab hooks are at the ends of said lower bar and chains are secured to the ends of said upper bar and hang down toward said grab hooks on said lower bar.

23. The tow bar defined in claim 20 wherein said grab hooks are secured to said lower bar at positions inwardly of its ends, and lengths of chains are similarly secured to said upper bar at corresponding positions inwardly of its ends.

24. The tow bar defined in claim 20 wherein a first pair of grab hooks is secured to said lower bar and a second pair is secured to said upper bar, said first pair being aligned with second pair, and a chain secured between corresponding hooks of the two pairs.

25. Vehicle lifting apparatus comprising
a first rigid, generally horizontal lower bar adapted to be positioned adjacent to the bumper of a vehicle to be lifted,
a second rigid, generally horizontal upper bar adapted to be coupled to a lifting crane,
first and second flexible, resilient slings coupled side-by-side between said first and second bars,
said first sling having first coupling means at each end for coupling to said upper and lower bars,
said second sling having said first coupling means at each end for coupling to said upper and lower bars,
each bar having second coupling means to which the coupling means at the ends of said slings can be connected,
the coupling of said first coupling means at one end of each of said slings to said second coupling means of one of said bars including a mechanical coupler which can be manually operated to make or break the coupling of said one end of said slings to said one bar, and
a pair of chains spaced apart and secured between said bars for cradling a vehicle in place of said slings when said slings are disconnected from between said bars.

26. The apparatus defined in claim 25 wherein said chains are of fixed length and are secured between the ends of said bars.

27. The apparatus defined in claim 25 wherein said mechanical coupler includes a pin which is permanently secured to its sling and is adapted to engage an aperture in one of said bars, said pin also permitting its sling to pivot and adjust its position when engaging and lifting a vehicle.

28. The apparatus defined in claim 25 wherein said coupling means on at least one end of each sling comprises a metal bracket secured to the sling and a pin for securing said bracket to one of said bars by engaging an apertured portion of said one of said bars.

29. The apparatus defined in claim 25 wherein said mechanical coupler includes a quick disconnect pin.

References Cited

UNITED STATES PATENTS

| | | | |
|---|---|---|---|
| 2,712,877 | 7/1955 | Wiley | 214—86 |
| 2,913,131 | 11/1959 | Holmes | 214—86 |
| 3,182,828 | 5/1965 | Ormsby | 214—86 |

ALBERT J. MAKAY, *Primary Examiner.*

U.S. Cl. X.R.

280—474